June 18, 1963　　　V. E. SPROUSE　　　3,094,138

FLOAT VALVE MOUNTING

Filed Sept. 13, 1961

INVENTOR
VERNER E. SPROUSE
BY *Herbert Q. Neinturn*
ATTORNEY

United States Patent Office 3,094,138
Patented June 18, 1963

3,094,138
FLOAT VALVE MOUNTING
Verner E. Sprouse, Columbus, Ind., assignor to Vernco Corporation, Columbus, Ind., a corporation of Indiana
Filed Sept. 13, 1961, Ser. No. 137,801
4 Claims. (Cl. 137—448)

This invention relates to simple means for mounting a float valve on the wall of a bracket or wall of a tank in which the float may be used.

The primary objects of the invention reside in extreme simplicity of the mounting requiring a minimum number of parts; the retaining of the valve in a predetermined position against possible shifting particularly in a rotative manner; and providing for securement by a single nut.

These and other advantages of the invention will become apparent to those versed in the art in the following description of one particular form as illustrated in the accompanying drawing in which.

Figure 1:
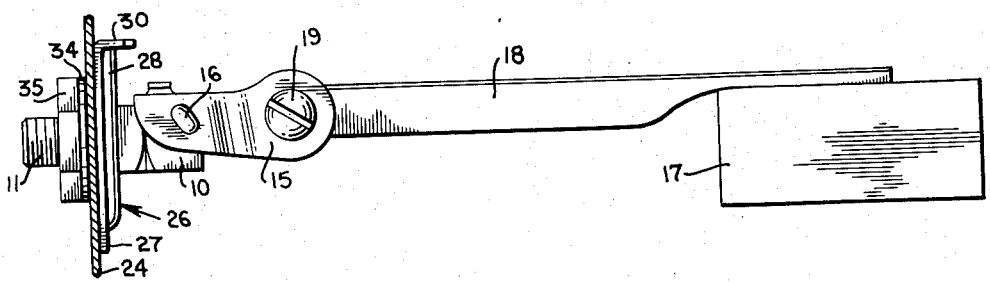
FIG. 1 is a view in side elevation and partial section of a float valve mounting embodying the invention.
Figure 2:
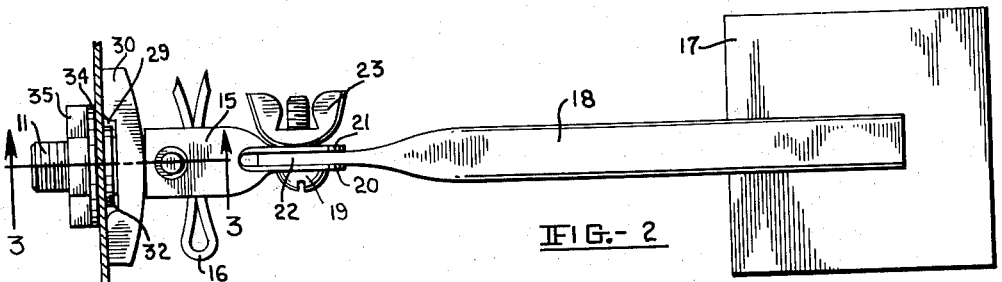
FIG. 2 is a view in top plan and partial section of the mounting.

A valve body 10 is generally rectangular in shape in vertical cross-section. A threaded, cylindrical stem 11 extends from the body 10. The body 10 has an internal passageway 12 which discharges through a concave outer surface 13 located on the topside of the body. A button 14 is fixed to the underside of a U-shaped member 15. This member 15 straddles the body 10 and is rockably attached thereto by any suitable means, herein shown as by a cotter pin 16 passing through the member 15 and the body 10 to form a pivot about which the member 15 may rock and bring the button 14 into seating condition over the passageway 12 on the surface 13 to close off flow from the passageway 12. A float 17 is fixed to an arm 18 in turn adjustably fixed to the member 15 as best indicated in FIG. 2. The attachment of the arm 18 to the member 15 is shown in the preferred form as consisting of a bolt 19 passing through arms 20 and 21 of the member 15 and through a section 22 of the arm 18. A wing nut 23 engaging with the bolt 19 is turned to compress the arms 20 and 21 against the arm section 22 to retain the arm in any angular position relative to the member 15 as may be required to position the float 17.

A wall 24 is provided with an opening 25 through which the stem 11 may be slidingly passed to extend a distance from the wall. From the side of the wall 24 from which the stem 11 is to be inserted through the wall, a bracket generally designated by the numeral 26 is fixed to the wall. This bracket 26 is provided with a flange 27 bearing against and fixed to the wall 24.

The central zone of the bracket 26 is rectangularly cup-shaped by an outwardly extending integral wall 28. This cup-shaped wall 28 forms an opening 29 at the top of the bracket 26, and a flange 30 is turned outwardly from the flange 27 and the wall 28 substantially at right angles thereto. A rectangular hole 31 is provided through the wall 28 and is dimensioned to receive slidingly therethrough the body 10. The plate 26 is mounted on the wall 24 so that the opening 31 is centered with the opening 25 of the wall 24.

A sealing washer 32 is dropped down through the opening 29 between the bracket 26 and the wall 24. The body stem 11 is threaded through the bracket plate opening 31, the washer 32, and the wall hole 25 to bring the end 33 of the body 10 up against the washer 32 in turn pressing the washer against the wall 24. A sealing washer 34 is placed over the stem 11 and a nut 35 is threaded on the stem 11 and turned to compress the two washers 32 and 34 from opposite sides and against the wall 24 to effect a liquid tight seal.

Figure 3:
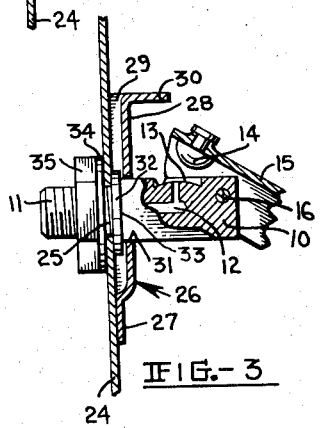
FIG. 3 is a view in vertical section on the line 3—3 with the valve open.
Figure 4:
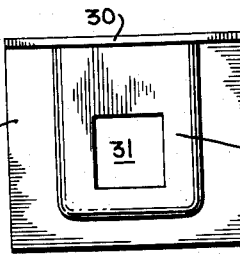
FIG. 4 is a view on an enlarged scale in front elevation of a valve holding plate.

In this manner, the body 10 is automatically held against rotation by the margins of the opening 31 in the bracket 26 and only one nut 35 needs to be employed. The upper flange 30 serves as a splash shield to prevent water from squirting upwardly against the wall 24 as it leaves the opened passageway 12 when the button 14 is rocked to the passageway uncovered position as indicated in FIG. 3.

Therefore it is to be seen that I have provided an extremely simple mounting of the valve on a more or less vertically disposed wall and while I have shown and described the structure of this mounting in one particular form, it is obvious that structural changes may be employed, particularly in the construction of the valve itself, without departing from the spirit of the invention. I therefore do not desire to be limited to that precise form beyond the limitations which may be imposed by the following claims.

I claim:

1. The combination of a wall having an opening therethrough; a valve body portion; a threaded stem extending from said portion; a bracket fixed to said wall; a cupped portion of said bracket extending in spaced relation from said wall and having an opening on one side of the bracket between said wall and said cupped portion; said cupped bracket portion having a body receiving opening; a washer within said cupped portion; said body portion entering said receiving opening and said stem passing through said washer and said wall opening to extend beyond said wall; a washer on said stem on the side of said wall removed from said bracket; a nut carried on said stem drawing said body portion against said washer in said cupped bracket portion against said wall on the bracket side of the wall, and said opposite side wall washer against the wall, sealing off the body opening; abutments around the periphery of the opening through said bracket; and said body portion lying within said bracket opening having an abutment interengaging between said bracket abutments maintaining the body portion against rotation relative to said wall.

2. The structure of claim 1 in which said body portion has a passageway opening from a side thereof adjacent said bracket, said bracket has a splash shield, and the margin of said bracket opening positioning said body portion to have said shield deflect discharge from said body passageway away from said wall.

3. The structure of claim 1 in which said body portion has a plurality of faces therearound and the margin of said bracket opening has corresponding faces in the path of the body portion faces constituting said anti-rotation means.

4. The structure of claim 3 in which said body portion and bracket hole margin abutments comprise right angle surface faces on each wherein the faces are disposed around the body portion and the margin in matching relation one with the other.

References Cited in the file of this patent
UNITED STATES PATENTS

| | | |
|---|---|---|
| 1,740,765 | Burnett | Dec. 24, 1929 |
| 2,766,770 | Dickinson | Oct. 16, 1956 |
| 3,004,748 | Sprouse et al. | Oct. 17, 1961 |